(12) United States Patent
Bock et al.

(10) Patent No.: US 6,370,199 B1
(45) Date of Patent: Apr. 9, 2002

(54) METHOD AND APPARATUS FOR PROCESSING COMPRESSED VIDEO DATA STREAMS

(75) Inventors: Alois Martin Bock, Eastleigh (GB); John Paul Jordan, Santa Clara, CA (US)

(73) Assignee: Tandberg Television ASA, Lysaker (NO)

( * ) Notice: Subject to any disclaimer, the term of this patent is extended or adjusted under 35 U.S.C. 154(b) by 0 days.

(21) Appl. No.: 09/286,371

(22) Filed: Apr. 5, 1999

(30) Foreign Application Priority Data

Apr. 3, 1998 (GB) .............................................. 9807202

(51) Int. Cl.[7] ................................................. H04B 1/66
(52) U.S. Cl. ...................... 375/240.28; 348/705; 725/36
(58) Field of Search .................... 375/240.28; 348/705; 725/36

(56) References Cited

U.S. PATENT DOCUMENTS

| 5,424,770 A | * | 6/1995 | Schmelzer et al. ........... 725/36 |
| 5,559,562 A | | 9/1996 | Ferster .................. 375/240.25 |
| 5,602,592 A | | 2/1997 | Mori et al. ............. 375/240.12 |
| 6,201,536 B1 | * | 3/2001 | Hendricks et al. .......... 345/716 |

FOREIGN PATENT DOCUMENTS

| EP | 0 692 911 A2 | 1/1996 |
| EP | 0 755 157 A2 | 1/1997 |
| GB | 2 307 613 A | 5/1997 |
| WO | WO 95/33342 | 12/1995 |

* cited by examiner

*Primary Examiner*—Howard Britton
(74) *Attorney, Agent, or Firm*—Wildman, Harrold, Allen & Dixon

(57) ABSTRACT

The present invention relates to the field of digital broadcasting, and more particularly the insertion of digital video streams into other digital video streams. Compressed digital video streams, such as those compressed using the common MPEG-2 system, use a sequence of frames to compress a video sequence. Part of the encoding method to compress frames involves making predictions based on past or future frames. Where part of a compressed video stream is to be inserted into another existing video stream, problems may arise at the insertion point due to dependencies on past or future frames which occur outside of the insertion point. The effect of this is that the decoding process lacks information on which to make its predictions, and this could cause a decoder to reset or display frames out of order. The present invention overcomes this problem in a way which allows frame accurate insertion to be achieved without compromising quality. The present invention can be used to pre-process a compressed video stream ready for insertion, or can be used to dynamically insert a compressed video stream into an existing compressed video stream.

12 Claims, 5 Drawing Sheets

OUT point
(last frame)

OUT point
(last frame)

*Where ( ) denotes a "null frame"

←A

OUT point
(last frame)

←A

Slice syntax of the 2
frames are swapped

←B

OUT point
(last frame)

METHOD AND APPARATUS FOR PROCESSING COMPRESSED VIDEO DATA STREAMS

The present invention relates to the field of digital broadcasting, and more particularly the insertion of digital video streams into other digital video streams.

Digital television involves the generation and storage of enormous quantities of data. Digital compression techniques can be applied to this data to drastically reduce the volumes of data required for transmission and storage. One compression technique common in the field is MPEG-2. MPEG-2 compresses video data by removing or reducing redundancy inherent in many types of image or video sequences. MPEG-2 makes use of three different types of frame which enable redundancy to be minimised. The three types of frames used are known as I frames, B frames and P frames.

I frames contain information which allows a complete frame to be reconstructed from only the data contained within the I frame. P frames use a single previously reconstructed frame as the basis for temporal prediction calculations. P frames base their predictions on the nearest I or P frame, and this is known as forward prediction. B frames use bi-directionally interpolated motion prediction to allow a decoder to rebuild a frame that is located between two reconstructed display frames. B frames use both past frames and future frames to make their predictions and require more than two frames of video storage. MPEG-2 video streams are made of a sequence of I, P and B frames which describe the video sequence.

The decompression and display of MPEG-2 compressed video streams may therefore rely on both past and future frames. Given the nature of compressed video streams, certain functions such as editing and insertion of bit-streams becomes problematic. If a compressed video sequence is cut at any point in time it is likely the frame immediately prior to the cut may well be dependent on information contained in subsequent frames to complete the decoding process. Also, if a video sequence is inserted into a video stream it is also likely that the first frames of the video sequence are based on previous frames which no longer exist.

If any frame required by the decoding process, such as a previous or future frame, is missing, this will lead to temporary breakdown of the decoding process until the next I frame is received. This will result in a temporary reduction of quality of the decoded image.

The problem could be avoided if frame accurate insertion is not required, however this is not a suitable solution for the broadcaster.

A problem therefore arises where frame accurate editing and insertion of compressed video bit-streams is required.

Accordingly, one object of the present invention is to provide a method and apparatus to enable frame accurate editing and insertion of compressed video streams.

According to one aspect of the present invention there is provided a method of processing a compressed digital bit-stream including a sequence of temporally referenced frames, at least some of which are coded in dependence on information in preceding or succeeding frames, to allow the bit-stream to be inserted into another such digital bit-stream, the method comprising the steps of: identifying the presence of one or more frames at a given insertion point which are coded in dependence upon one or more frames beyond the insertion point; and modifying the sequence so as to remove any such dependency and maintain continuity of the temporal references.

According to a second aspect of the present invention there is provided apparatus for processing a compressed digital bit-stream including a sequence of temporally referenced frames, at least some of which are coded in dependence on information in preceding or succeeding frames, to allow the bit-stream to be inserted into another such digital bit-stream, the apparatus comprising the steps of: a detector for identifying the presence of one or more frames at a given insertion point which are coded in dependence upon one or more frames beyond the insertion point; and a processor for modifying the sequence so as to remove any such dependency and maintain continuity of the temporal referencing.

The invention will now be described, by way of example, with reference to the following diagrams, in which.

Figure 1:
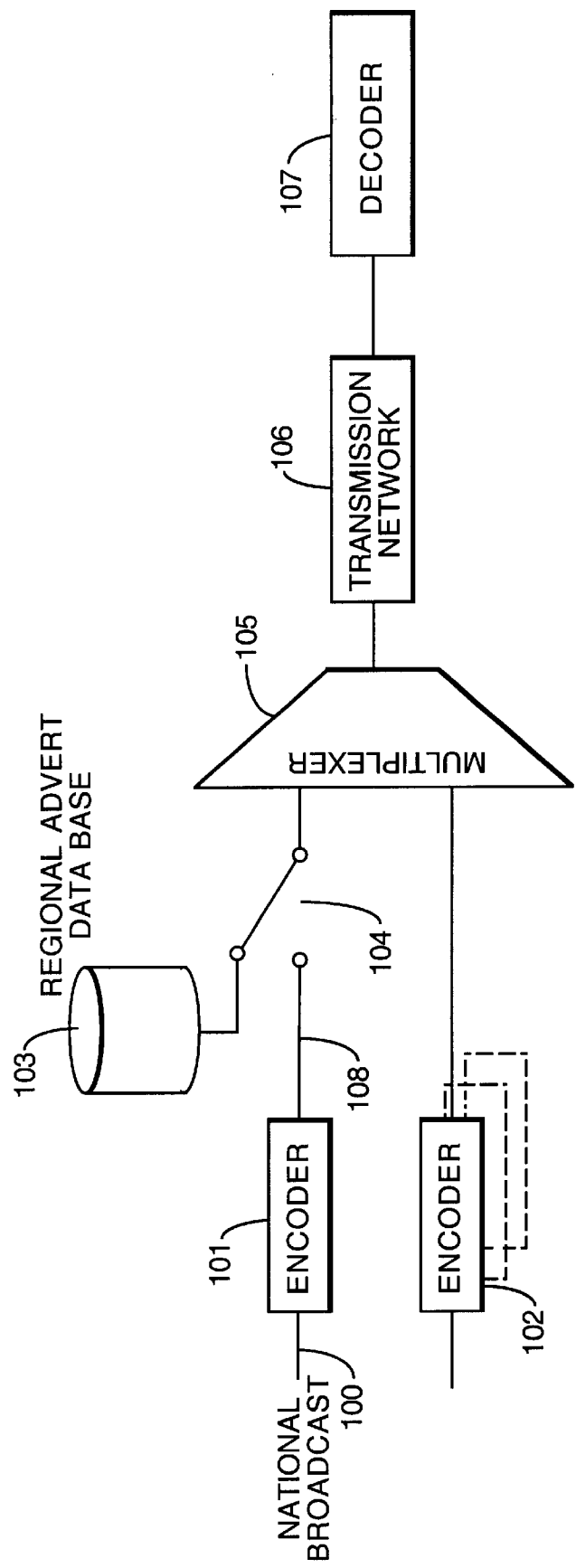
FIG. 1 is a diagram showing an overview of the broadcasting system according to the present invention.

FIG. 1 is a diagram showing a broadcast system according to the present invention. A national broadcast 100 is encoded by an encoder 101 which compresses the input data into a compressed or encoded digital bit-stream 108. A switch 104 is used, in this example, to insert regional adverts from a database 103 into the national broadcast stream 108.

A number of other encoders, one of which is shown at 102, also encode other input signals into compressed digital bit-streams. Each of the encoded bit-streams are input to a multiplexer 105 which multiplexes each of the individual bit-streams to form a single multiplexed bit-stream ready for transmission via a transmission network 106. The transmission network could include a satellite, cable, microwave, terrestrial or other broadcasting network. The transmitted bit-stream is capable of being received by an appropriate decoder, one of which is shown at 107.

An MPEG data stream comprises a continuous series of coded frames, consisting of I, B and P frames. As indicated above, many of the frames in the data stream are critically dependent upon their predecessors or successors due to the usage of both forward and backward prediction. There are many ways in which a data stream could be encoded and two common formats are 'Single B Frame' and 'Double B Frame'. These formats relate to the arrangement of the different types of frames in a frame sequence. A frame sequence is grouped into a unit known as a group of pictures, more commonly referred to as GOP. The number of frames in a GOP, known as the GOP length, varies according to the format of encoding employed by an encoder.

Single B Frame encoding produces a frame sequence as follows: "IBPBPBPB . . . ". After an initial I frame, there follows a sequence of alternate B and P frames. Single B frame encoding is more commonly used for the PAL television standard and usually has a GOP length of 12 frames.

Double B Frame encoding produces a frame sequence as follows: "IBBPBBPBB . . . ". After an initial I frame, there follows a sequence of two B frames and one P frame. Double B frame encoding is more commonly used for the NTSC television standard and usually has a GOP length 15 frames.

The type of encoding can be selected at the encoder according to the requirements of the broadcaster.

Figure 2:
FIG. 2 is a diagram showing a typical frame sequence in display order of MPEG-2 video frames.

Referring now to FIG. 2, t here is shown a typical frame sequence of single B frame encoded video frames. The frame sequence comprises a number of different I frames, P frames and B frames. The letters shown in the diagrams denote the type of frame: I for an I frame, P for a P frame and B for a B frame. The subscripted numerals denote the temporal reference which indicates the order in which the frames will be displayed by the decoder. The term 'IN point' is used to denote the first frame of a video sequence and 'OUT point' is used to denote the last frame of a sequence to be inserted into an existing data stream. The sequence of frames between the 'IN point' and the 'OUT point' is referred to as a video sequence . This notation is used throughout this specification.

Figure 3:
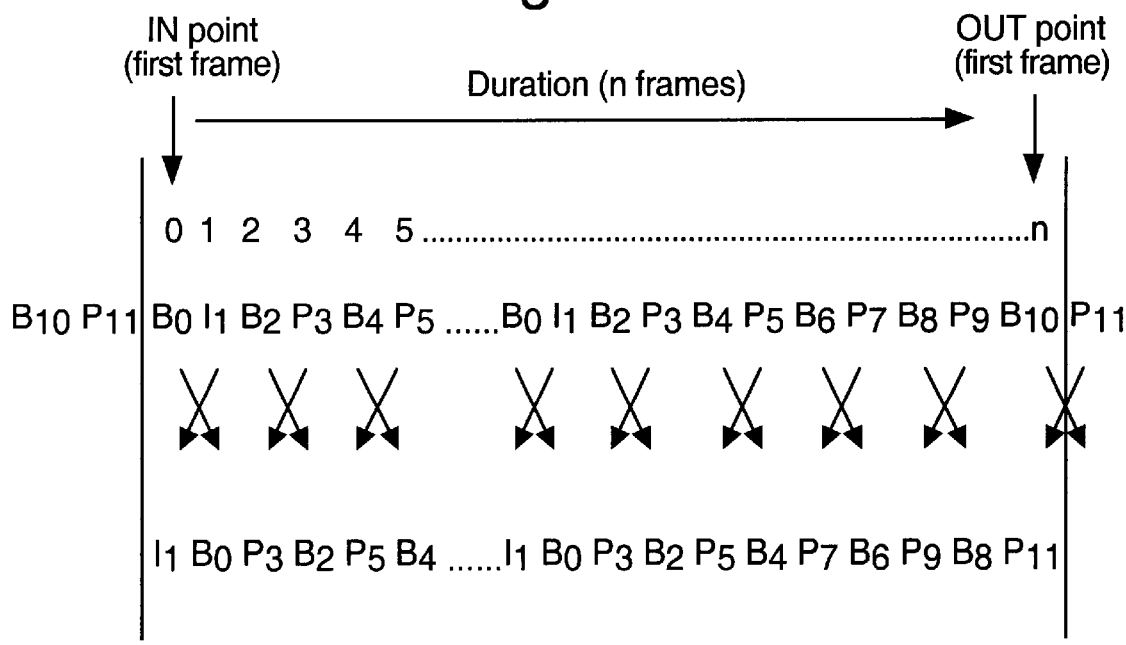
FIG. 3 is a diagram showing the effect of conventional B frame re-ordering for transmission.

FIG. 3 shows how a frame sequence is conventionally re-ordered for transmission. This basically involves swapping any B frames with the next frame in the sequence. This ensures that the decoder receives the frames in the correct order for decoding and making the necessary predictions.

In order to insert a video sequence into an existing data stream the video sequence will need modifying after the 'IN point' and potentially before the 'OUT point' to ensure that the insertion is seamless or near seamless i.e. that the insertion is not apparent to the viewer.

Considering the 'IN point', any B frames immediately following the first I frame and before the first P frame will potentially reference (or be predicted from) a previous P frame that no longer exists because it occurs before the 'IN point' and does not therefore form part of the current video sequence.

Figure 5:
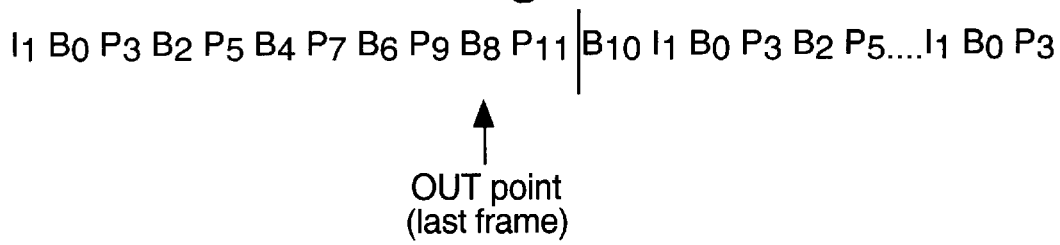
FIG. 5 is a diagram showing a video sequence where the insertion point falls on an odd frame.

An 'OUT point' is likely to occur anywhere within the GOP and probably on a B or P frame. If the sequence duration is of an odd number of frames (where the GOP length is even and single B frame encoding is used) then a problem can occur whereby the last frame in the sequence has a temporal reference that does not follow on from any previous temporal reference. FIG. 5 is a diagram showing a video sequence in which the 'OUT point' falls on an odd numbered frame. In this example, the frame sequence is missing the temporal reference 10, and this causes a discontinuity in the temporal references within the video sequence. This will most likely cause the decoder to display frames out of sequence and/or reset decoding, disrupting the display of the video sequence. This problem is compounded where 'double B frames' are employed as two temporal references may be missing.

The present invention provides a solution to these problems and provides a method and apparatus for seamlessly or near seamlessly inserting bit-streams into existing bit-streams.

The process of modifying the bit-streams to provide seamless or near seamless insertion can be divided into two separate processes. One processing the start of the sequence and the second processing the end of the sequence Immediately after an 'IN point', any frames having a dependency on other frames occurring before the 'IN point' must be modified to allow the video sequence to be inserted into an existing data stream. The only frames which are dependent on previous frames are B frames, since they are bi-directionally predicted. It follows that any B frames immediately following the first I frame and before the next P frame will require modification and must either be removed or forced to make only forward predictions.

One solution is to replace any B frames with null B frames. A null frame removes any problems associated with dependency on other frames by causing the decoder to perform a freeze frame or fade between the adjacent frames. A null frame in this sense is a frame in which the macroblocks are not coded.

A null frame is produced when all elementary stream syntax associated with the frame is replaced by zero values, known as stuffing. In addition to the stuffing a number of control bytes are also inserted after each slice header. The following parameters are used in the first and last macroblock of each slice to produce a null frame:

Coded_block_pattern, cpb=0

Motion_vectors=0

Macroblock header only

After the first macroblock the macroblock_address_increment is increased to the last macroblock-1, then the last macroblock is coded the same as the first.

The concept of null frames can also be applied to P frames.

The end of a video sequence will potentially also need processing to enable seamless or near-seamless insertion into an existing data stream. The following examples are based on single B frame encoding having an even GOP length.

Figure 4:
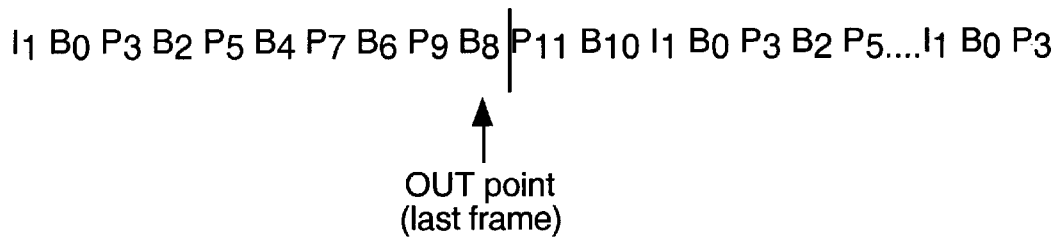
FIG. 4 is a diagram showing a video sequence where the insertion point falls on an even frame.

FIG. 4 illustrates a frame sequence having an even number of frames, the last frame in the sequence being a B frame with a temporal reference of 8. As can be seen, the previous frame $P_9$ (a P frame) has a temporal reference of 9 and will therefore be displayed by a decoder directly after the display of the B frame $B_8$. The 'anchor' frames (i.e. the frames from which the B frame is predicted) for $B_8$ are $P_7$ and $P_9$, therefore this 'OUT point' is complete since all of the frame dependencies are within the video sequence, and hence requires no post-processing.

Now consider FIG. 5, representing a sequence with a duration comprising an odd number of frames in which the last frame in the sequence is a P frame and is shown as $P_{11}$. The previous frame, $B_8$, has a temporal reference of 8 and this is preceded by a P frame $P_9$ with a temporal reference of 9. The frame with a temporal reference of 10 (the next B frame) $B_{10}$ is no longer present in the truncated sequence and is dependent on a frame which is not part of the video sequence. This then gives rise to a discontinuity in the temporal references which is likely to upset the decoding process, most likely leading to frames being displayed out of order and/or causing the decoder to reset. Therefore, this 'OUT point' is not complete and requires post-processing to allow insertion into another data stream.

Figure 6:
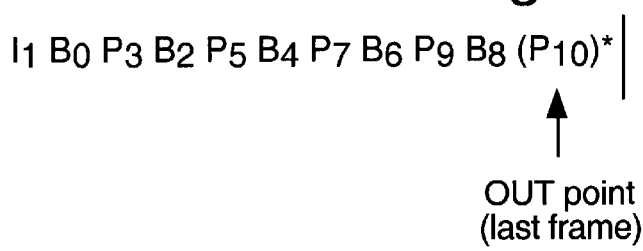
FIG. 6 is a diagram showing a modification of the video sequence of FIG. 5.

To address the problem associated with odd length GOPs, one solution is to change the P frame to a null P frame and change the temporal reference associated with it from 11 to 10. This is illustrated in FIG. 6. This then gives a smooth increment of the temporal reference through to the new 'OUT point'. Changing the P frame to a null P frame produces a freeze frame at the end of the sequence and before the start of a new sequence. This method has limited success due to the fact that the new temporal reference and frame type is not what the decoder expects to see and this may result in frames being repeated or displayed out of order. Furthermore, the changing of the P frame to a null P frame gives rise to a freeze frame based on the $P_9$ frame, a frame some 2 frames earlier in display order.

Figure 7:
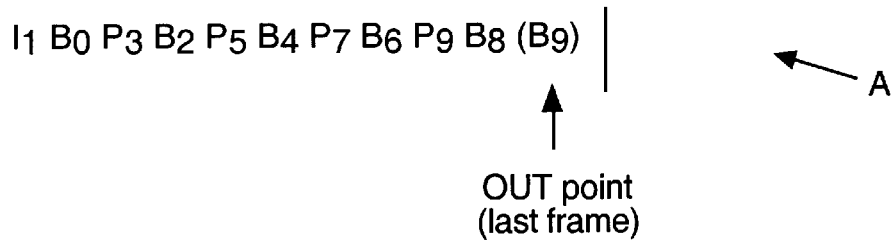
FIG. 7 is a diagram showing a modification of the video sequence of FIG. 6.

An improvement on the above solution is shown in FIG. 7. Note now that the last P frame has been replaced by a null B frame and the temporal reference is again changed, but this time to 9. Also, the temporal reference applied to the previous P frame has been changed from 9 to 10. This improves on the first scheme by 'pre-warning' the decoder to expect the temporal references 8 and 9 following the P frame, $P_{10}$, and thus results in a continuous increment of the temporal references.

Figure 8:
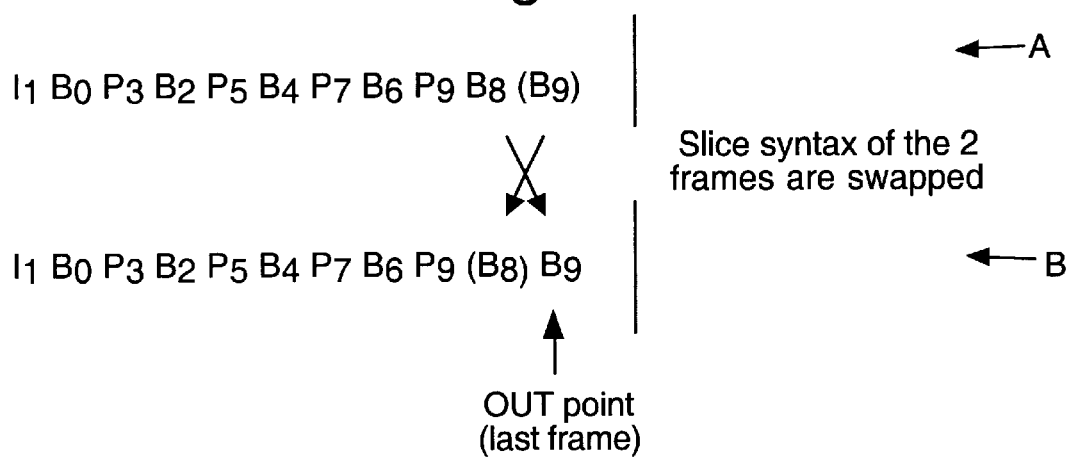
FIG. 8 is a diagram showing a modification of the video sequence of FIG. 7.

A further improvement is shown in FIG. 8. The 'swapping' of the frame syntax (i.e. the swapping of which frame is changed to a null frame) addresses the problem of the freeze frame produced in FIG. 6.

Figure 9:
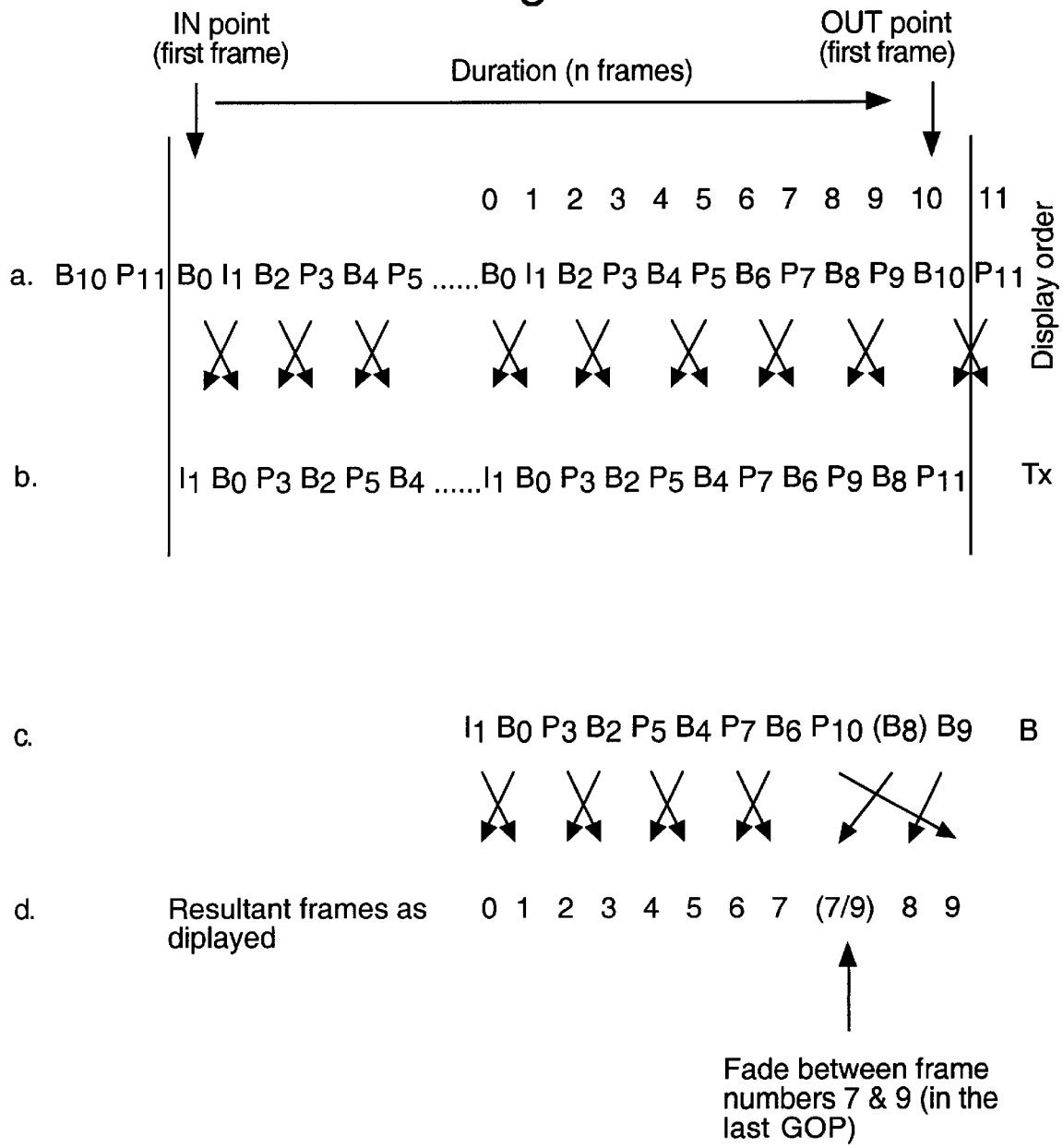
FIG. 9 is a diagram showing the preferred modifications of a video sequence.

Referring now to FIG. 9 there is shown the preferred solution according to the present invention which produces a video sequence which represents the best compromise in terms of both the pictures displayed and the temporal reference ordering for the decoder. FIG. 9a represents a video sequence prior to transmission with the temporal references in ascending order. FIG. 9b shows the video sequence after frame reordering has taken place.

FIG. 9c shows that the temporal reference on $P_9$ (the penultimate P frame in the video sequence) is incremented to 10. A null B frame is then inserted after $P_{10}$. The effect of this is to remove P frame $P_{11}$ from the sequence. The temporal references on the final B frames are then modified to have a continuous incrementation. FIG. 10d shows the resultant pictures displayed follow almost completely linearly and includes a fade frame that comprises an interpolation of frames 7 and 9. This solution when applied as a post-processing function has the best chance of being displayed correctly by the decoder, particularly where the decoder implementation detail is not known, or the decoder population is mixed.

Anyone skilled in the art would appreciate that the techniques described above could equally be applied, with the relevant modifications, to other formats of frame encoding, including double B frames and different length GOPs.

Figure 10:
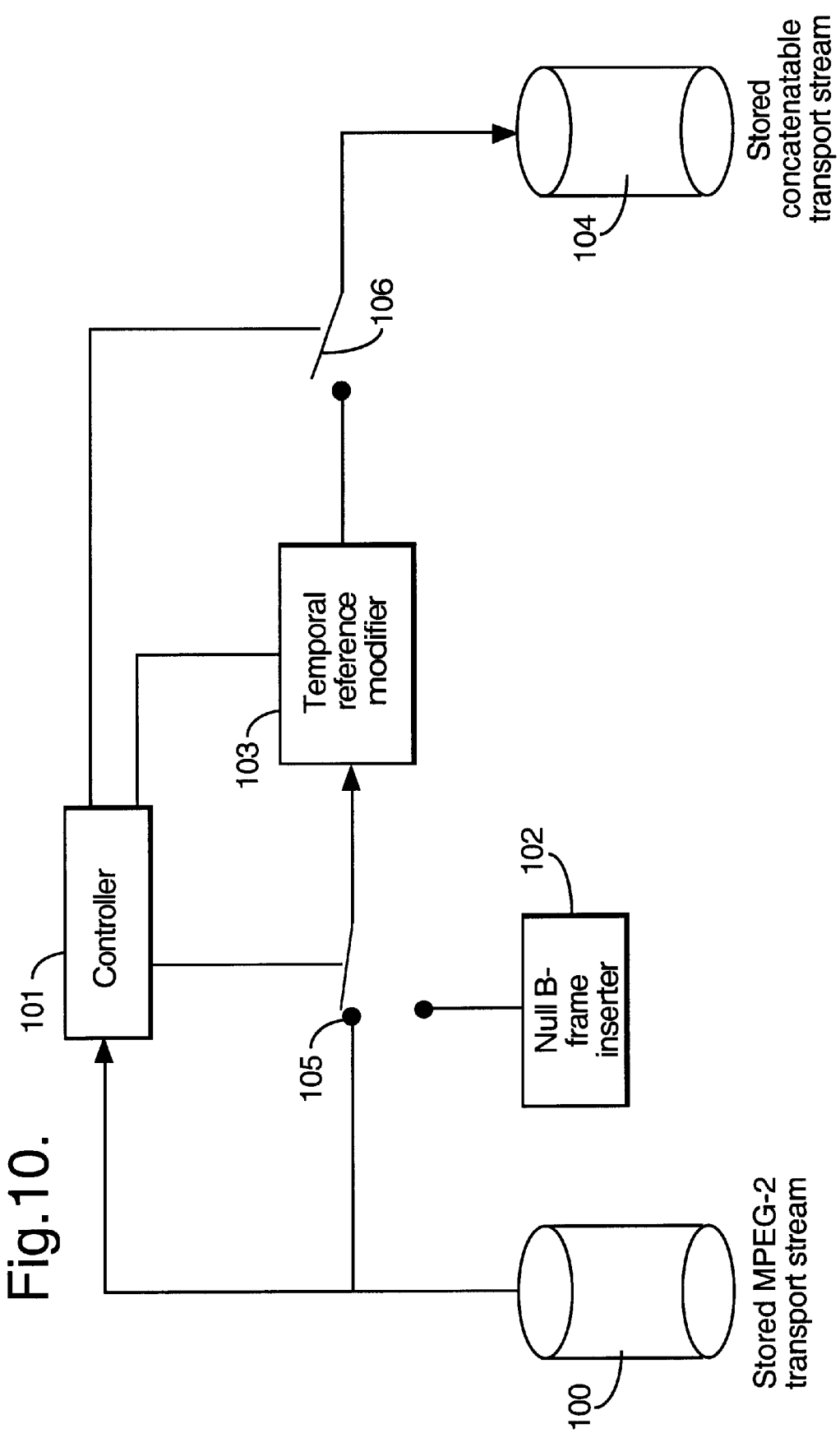
FIG. 10 is a diagram showing one embodiment of the present invention.

FIG. 10 is a diagram showing an overview of one embodiment of the present invention.

A compressed video stream is stored in a storage device 100. The stored video stream, as described above, may require modifications to enable it to be inserted into an existing video stream. A controller 101 looks at both the start of the video stream and the end of the video stream and controls the modifications that are required to 'repair' any problems with the frame sequence.

The start of the video sequence may start on either an I, P or B frame depending on the position of the 'IN point'. The controller 101 looks at the start of the sequence and identifies any B frames which occur between the first I frame and before the next P frame. The controller causes these B frames to be replaced with null B frames through a switch 105. The coding of null frames removes any problems associated with reference to other frames by causing the decoder to perform a freeze frame or a fade between two sequences.

If the controller 101 detects a frame dependency outside of the current video sequence, it inserts a null B frame, via a switch 105, after the penultimate P frame in the sequence. This has the effect of removing the last P frame from the sequence. The temporal reference modifier then modifies the temporal reference as shown in FIG. 9c. This ensures that the temporal references form an incremental sequence when displayed by a decoder. The amended sequence is then stored in a storage device 104. The result of this operation is that the compressed video stream can now be seamlessly or near seamlessly inserted into another video stream processed in the same way.

The present invention can be used to process stored video sequences such that they are ready for insertion with an existing compressed video stream, as described above. Alternatively, the present invention could be used at a video insertion switch, such as the switch 104 of FIG. 1, which would accept unmodified compressed video streams and would prepare them for insertion using the method of the present invention in real-time.

The present invention has particular application where regional or national adverts are to be inserted into an existing compressed video stream. It can equally be used to create sequences which are to be continuously looped.

What is claimed is:

1. A method of processing a compressed digital bit-stream including a sequence of temporally referenced frames, at least some of which are coded in dependence on information in preceding or succeeding frames, to allow the bit-stream to be inserted into another such digital bit-stream, the method comprising the steps of:

identifying the presence of one or more frames at a given insertion point which are coded in dependence upon one or more frames beyond the insertion point; and modifying the sequence so as to remove any such dependency and maintain continuity of the temporal references.

2. The method of claim 1, wherein the step of modifying the sequence includes changing the type of frames in the sequence.

3. The method of claim 1 wherein the step of modifying the sequence includes changing the type of frames to null frames.

4. The method of claim 1, wherein the step of modifying the sequence, further includes selectively modifying the temporal references to ensure that the frames will be displayed in the correct order by a decoder.

5. Apparatus for processing a compressed digital bit-stream including a sequence of temporally referenced frames, at least some of which are coded in dependence on information in preceding or succeeding frames, to allow the bit-stream to be inserted into another such digital bit-stream, the apparatus comprising the steps of:

a detector for identifying the presence of one or more frames at a given insertion point which are coded in dependence upon one or more frames beyond the insertion point; and a processor for modifying the sequence so as to remove any such dependency and maintain continuity of the temporal referencing.

6. The apparatus of claim 5, wherein the processor is adapted to modifying the sequence by changing the type of frames within the sequence.

7. The apparatus of claim 6, wherein the processor is adapted for modifying the sequence by changing the type of frames to null frames.

8. The apparatus of claim 5, wherein the processor is adapted for selectively modifying the temporal references to ensure that the frames will be displayed in the correct order by a decoder.

9. The method of transmitting a digital bit-stream processed according to the method of claim 1.

10. The apparatus for transmitting a digital bit-stream created by the apparatus of claim 5.

11. A method of processing a compressed digital bit-stream including a sequence of temporally referenced frames, at least some of which are coded in dependence on information in preceding or succeeding frames, to allow the bit-stream to be inserted into another such digital bit-stream, the method comprising the steps of:

identifying the presence of one or more frames at a given insertion point which are coded in dependence upon one or more frames beyond the insertion point; and modifying the sequence so as to remove any such dependency and maintain continuity of the temporal references.

12. An apparatus for processing a compressed digital bit-stream including a sequence of temporally referenced frames, at least some of which are coded in dependence on information in preceding or succeeding frames, to allow the bit-stream to be inserted into another such digital bit-stream, the apparatus comprising the steps of:

a detector for identifying the presence of one or more frames at a given insertion point which are coded in dependence upon one or more frames beyond the insertion point; and a processor for modifying the sequence so as to remove any such dependency and maintain continuity of the temporal referencing.

* * * * *